United States Patent [19]
Shuler

[11] 3,960,412
[45] June 1, 1976

[54] WEAR-COMPENSATING REPLACEMENT SPROCKET

[75] Inventor: James R. Shuler, Eureka, Ill.

[73] Assignee: Caterpillar Tractor Co., Peoria, Ill.

[22] Filed: Mar. 10, 1975

[21] Appl. No.: 556,851

[52] U.S. Cl. .............................. 305/57; 74/243 DR; 74/243 PC
[51] Int. Cl.² ......................................... B62D 55/20
[58] Field of Search ................... 305/57, 56, 58, 45; 180/5 R; 74/243 DR, 243 PC

[56] References Cited
UNITED STATES PATENTS

| | | | |
|---|---|---|---|
| 2,365,544 | 12/1944 | Geyer | 305/57 |
| 3,069,922 | 12/1962 | Harvey | 74/243 DR |
| 3,136,171 | 6/1964 | Nodwell | 74/243 PC |
| 3,313,578 | 4/1967 | Wright | 305/57 |

Primary Examiner—Philip Goodman
Attorney, Agent, or Firm—Phillips, Moore, Weissenberger Lempio & Strabala

[57] ABSTRACT

The useful life of the track components of a track-type tractor are prolonged by providing wear-compensating means within the track chain and sprocket assembly. The wear within this assembly is compensated for by providing a sprocket drive chain having pin bushing wear surfaces and a sprocket with replaceable tooth segments so that the pitch diameter of the chain and sprocket may be maintained in matched relationship by replacing the tooth segments with tooth segments having a greater root diameter as the chain pin bushings wear.

6 Claims, 6 Drawing Figures

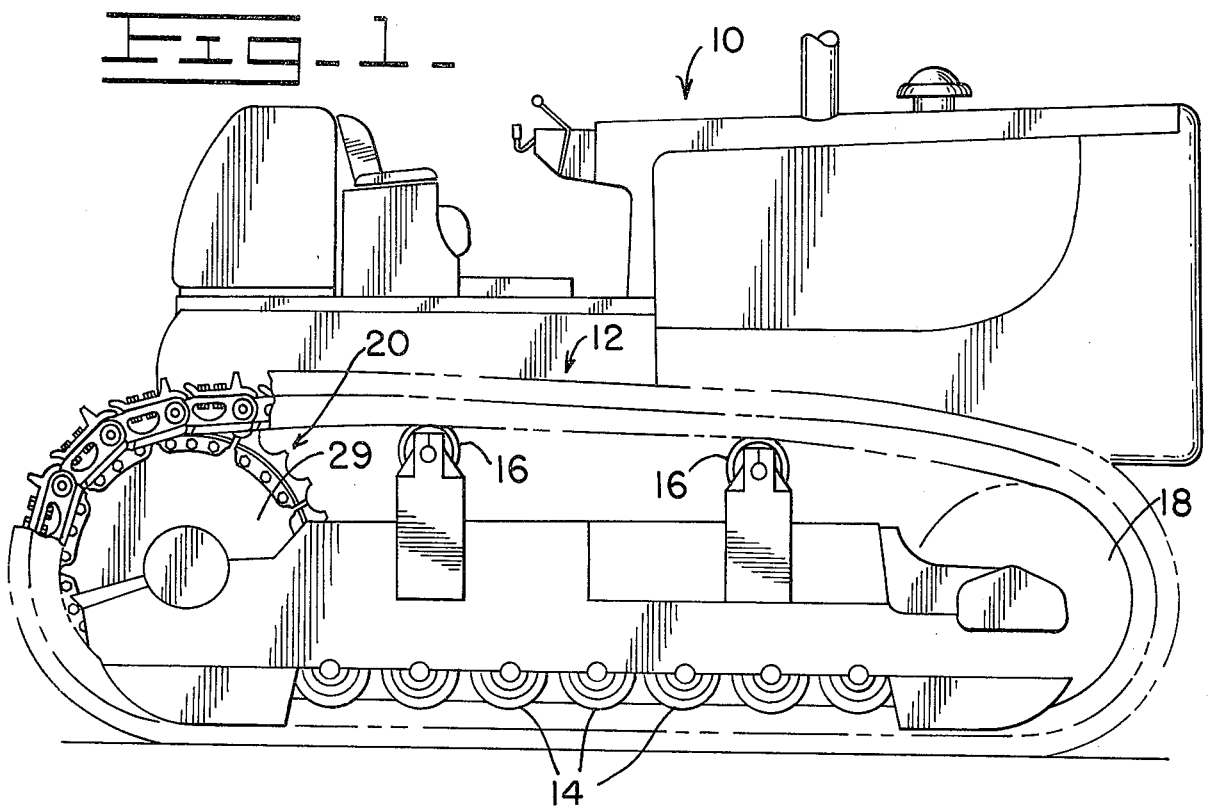
Fig_1_
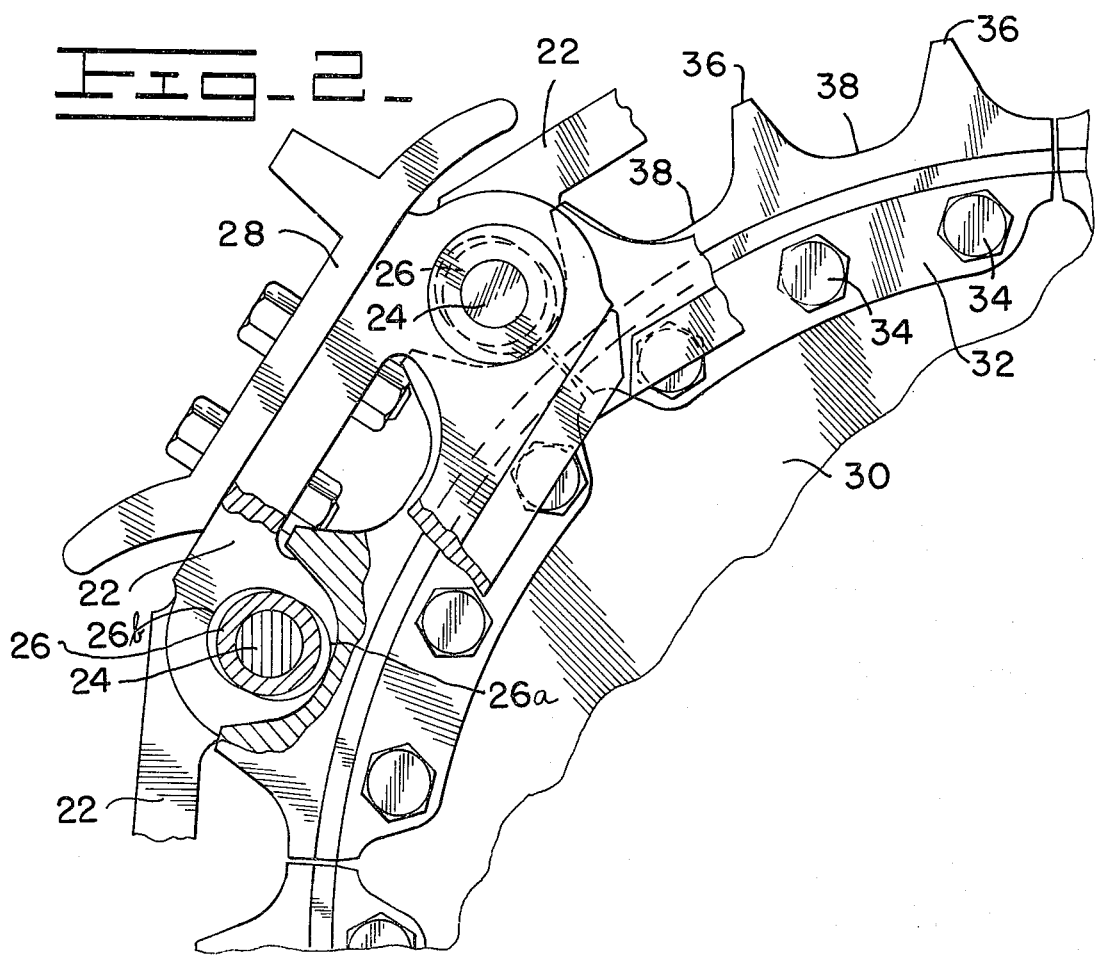
Fig_2_

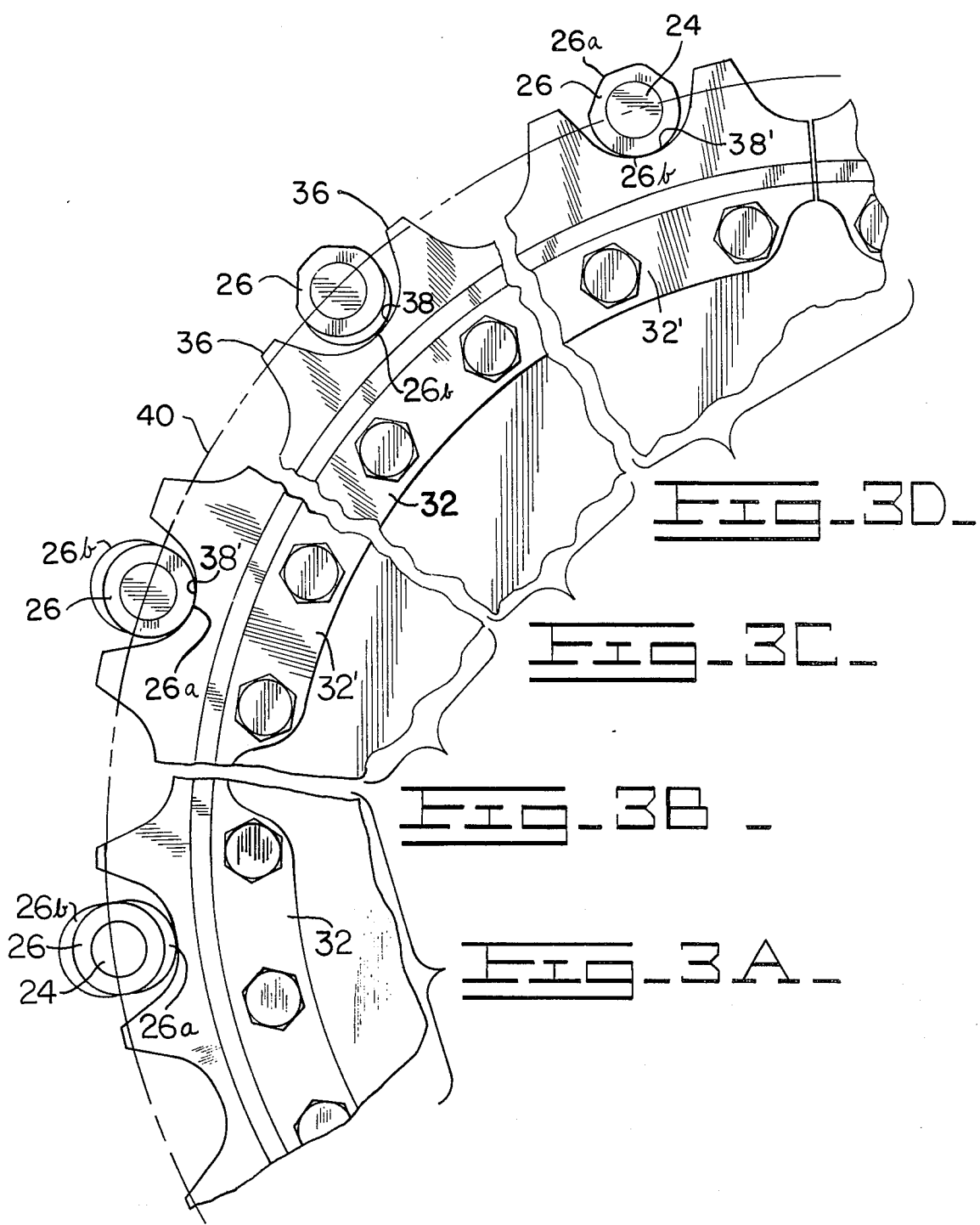

WEAR-COMPENSATING REPLACEMENT SPROCKET

BACKGROUND OF THE INVENTION

The present invention relates to the endless tracks for track-type tractors and particularly to methods and apparatus for prolonging the life of the components of such tracks.

The tracks of a track-type tractor are generally subjected to a very high rate of wear because of the abrasive atmosphere in which they normally operate. Numerous improvements in such tracks have been made over the years in order to prolong the life thereof. However, certain components within the track are still subjected to very high rates of wear.

Perhaps the most critical components of the many components making up the drive system of such a crawler tractor are the drive surfaces of the traction chain bushing and sprockets. These components are normally subjected to a very high wear rate because of the high loading on these components. This high rate of wear must be compensated for in order to avoid a mismatch of operating pitch between the chain and sprocket which could subject the components to increasingly high load stresses and scrubbing of pins and bushings and result in a premature wear and failure of the entire track chain.

Improvements in internal sealing and lubrication of the track chain joints have limited most wear in the track chain to the external bushing surfaces. When one side of the track bushing becomes worn, the bushing can be rotated 180° to permit the other side to be worn before the track bushing is discarded. Track pin pushings have been constructed to have an oval-shaped wear surface to increase the service life of the bushing. Such bushings are the subject of U.S. Pat. No. 3,313,578. Other patents of interest in connection with chain and sprocket wear problems are as follows: U.S. Pat. No. 3,220,273 issued Nov. 30, 1965; U.S. Pat. No. 1,358,474 issued Nov. 9, 1920; and U.S. Pat. No. 1,193,550 issued Aug. 8, 1916. British specification No. 28,981 dated A. D. 1897 also discloses an adjustable pitch chain which may be considered of interest with regard to the subject invention.

SUMMARY AND OBJECTS OF THE INVENTION

The primary object of the present invention is to overcome the above problems of the prior art.

A further object of the present invention is to provide a track chain and sprocket combination with means for compensating for wear within the assembly.

Another object of the present invention is to provide a chain and sprocket arrangement for tracks that includes means for compensating for wear within the assembly and maintaining a matched pitch diameter of the sprocket and chain.

In accordance with the present invention, wear within a sprocket and track arrangement is compensated for by maintaining a substantially matched pitch diameter of the chain and sprocket arrangement. This pitch diameter is maintained by providing a sprocket wheel having a series of replaceable teeth that have progressively larger root diameter for engagement with the chain to maintain matched pitch diameter thereof as the chain wears.

BRIEF DESCRIPTION OF THE DRAWINGS

The above and other objects and advantages of the present invention will become apparent from the following specification when read in conjunction with the drawings, wherein:

FIG. 1 is an elevational view of a track-type tractor embodying the present invention;

FIG. 2 is a detailed view of a portion of the track assembly of FIG. 1; and

FIGS. 3A–3D are detailed views of the sprocket and pin engagement area of the assembly of FIG. 2 illustrating the sequence of steps of the present invention.

DETAILED DESCRIPTION OF A PREFERRED EMBODIMENT

Referring now to FIG. 1 of the drawings, there is illustrated a track-type tractor generally designated by the numeral 10, mounted in the usual manner on a pair of endless tracks. The tracks are trained about a pair of support and carrier rollers 14 and 16 and an idler wheel 18 and a tooth sprocket 20 which make up a crawler drive system.

The endless track 12, as best seen in FIG. 2, is made up of a plurality of link members 22 pinned together by a plurality of pins 24 and pin bushings 26. A plurality of track shoes 28 are secured in a suitable manner, such as bolting, to the track links 22 to define the endless crawler track.

Each of the pin bushings 26 is constructed to have an outer substantially oval configuration to define a pair of oppositely disposed wear surfaces 26A and 26B. The drive sprocket 20 comprises an inner hub 30 to which is detachably secured a plurality of tooth segments 32. These tooth segments may be detachably secured in any suitable manner such as by means of a plurality of bolts 34 as illustrated. The gear segments 32 are provided with a plurality of teeth which are constructed to have a specified pitch and define a root 38 therebetween having a first or specified root diameter. The teeth engage at their roots the wear areas 26B of the pin bushings 26 as illustrated in FIG. 2. As the links of the chain rotate about the sprocket, it will be seen that the bushing surface 26B rotates with respect to the root 38 of the gear segment, thereby grinding or wearing away the bushing on that side. Wear is also caused at this point by the build-up of foreign material such as rust, rock, sand, or the like, which produces an abrading effect.

Turning now to FIGS. 3A through 3B, which are arranged in continuous fashion as segments of a single sprocket for the purposes of illustration and convenience of understanding, there is illustrated the structure as well as the sequence of the main stages or steps of the present invention. As seen in FIG. 3A, the assembly as originally assembled includes a pin 24 with a bushing 26 having its original configuration. It will be noted that the pin, bushing, and sprocket combination has a pitch designated by the pitch line or diameter 40. Upon continual operation of the machine for a considerable period of time, the pin eventually wears down until the first surface 26A is worn down to the original circular or cylindrical surface portion of the bushing 26 as best illustrated in FIG. 3B. At this point, the sprocket segment 32 is replaced with a high pitch segment 32' which engages pin bushing 26 by root 38' of the sprocket teeth 36'. This moves the pitch diameter back to approximately the original pitch diameter 40. The pitch 38' of segment 32' is greater than pitch 38 of segment 32 to compensate for the loss of wear surface 26a. The machine can then be operated for a considerable length of time with the pin bushings in this position. Continued wear, however, on the surface of the pin bushings 26 will wear them down the maximum permissible amount such that the 26a side of the bushing becomes essentially non-cylindrical in configuration as shown in FIG. 3C. At this time, in order to maintain a satisfactory matched pitch diameter as in the previous arrangements, the pin bushing 26 is rotated 180° to turn wear surface 26b toward the sprocket, as shown in FIG. 3C. The high pitch sprocket segment 32' is replaced with the original segment 32. This forces the center of the pin 24 out to a position as shown so that the pitch diameter of the sprocket and chain arrangement is again substantially at the same pitch diameter 40.

The machine can thus be operated with this assembly for a considerable period of time until the wear on the bushing surface 26B has reduced it to the configuration as shown in FIG. 3D. At this time the tooth setment 32 is replaced with tooth segment 32' to again return the pitch diameter substantially to the diameter 40.

Thus, by this apparatus, wear in the track assembly can be taken up or compensated for to a considerable extent and thus prolong the useful life of the track components.

The sprocket segments 32 and 32' are sized so that they may be replaced without breaking or separating the chain.

It is apparent that any number of segments of varying root diameters can be used in order to continually maintain a sprocket pitch diameter that matches the pitch of the chain over the life of the track chain pin assembly. It is also apparent that with the FIG. 3 configuration when the bushing has worn down to the substantially cylindrical configuration, the bushing can be rotated more than twice in order to present a wear surface to the root surface 38 of the teeth to thereby maintain a substantially matched pitch diameter 40 of the chain sprocket assembly. Thus, the bushing 26 may be rotated approximately 120° during or after a period of wear of the pin bushing. This returns the chain and sprocket assembly back close to its original pitch diameter.

From the above discussion and description it is seen that prolonged life of the bushings 28 is achieved by removing the sprocket segments 32 from the hub 30 and replacing them with segments 32' having enlarged tooth profile, after the added material or the wear material of the pins or bushing has worn away.

Replacement of the sprocket segments with the greater root diameter 38' also provides additional wear material and restores the operating pitch to an acceptable position or diameter. An acceptable pitch diameter is one in which there is a match between the chain and sprocket diameters so that excessive stresses are avoided. Thus, a considerably greater extended life may be obtained from the sprocket chain itself without replacement of the pins and bushings by the present method and apparatus.

While the present invention has been described with respect to specific embodiments, it is to be understood that numerous changes and modifications may be made therein without departing from the spirit and scope of the present invention as defined in the appended claims.

What is claimed is:

1. A method of compensating for wear in chain and sprocket drive arrangements by maintaining a substantially matched pitch diameter of said chain and sprocket as said wear takes place, said method comprising the steps of:

constructing a sprocket of a first set of replaceable tooth segments having a predetermined pitch diameter and root diameter for adjusting the pitch diameter of said sprocket;

constructing a chain having rotatable pin bushings with at least a first wear portion engaging said first root diameter of said sprocket for adjusting the pitch diameter of said chain;

adjusting the pitch diameter of one of said sprocket and said chain to thereby maintain a matched pitch diameter of said sprocket and chain drive arrangement;

including the step of replacing said tooth segments with tooth segments having a root diameter greater than said first root diameter as said bushings wear; and, wherein the step of constructing said chain includes constructing said pin bushings to have two wear areas, and the step of maintaining said matched pitch diameter includes rotating said pin to said second wear area when said first area becomes too worn to maintain said pitch diameter.

2. A method of compensating for wear in chain and sprocket drive arrangements by maintaining a substantially matched pitch diameter of said chain and sprocket as said wear takes place, said method comprising the steps of:

constructing a sprocket of a first set of replaceable tooth segments having a predetermined pitch diameter and root diameter for adjusting the pitch diameter of said sprocket;

constructing a chain having rotatable pin bushings to have an oval configuration for thereby defining a pair of wear faces with at least a first wear portion engaging said first root diameter of said sprocket for adjusting the pitch diameter of said chain; and, adjusting the pitch diameter of one of said sprocket by replacing said tooth segments with tooth segments having a root diameter greater than said first root diameter as said pins wear, and said chain by rotating said wear bushings thereby presenting a new wear face as each of said wear faces wears down to thereby maintain a matched pitch diameter of said sprocket and chain drive arrangement.

3. A method of compensating for wear in chain and sprocket drive arrangements by maintaining a substantially matched pitch diameter of said chain and sprocket as said wear takes place, said method comprising the steps of:

constructing a sprocket of a first set of replaceable tooth segments having a predetermined pitch diameter and root diameter for adjusting the pitch diameter of said sprocket;

constructing a chain having rotatable pin bushings with at least a first wear portion engaging said first root diameter of said sprocket for adjusting the pitch diameter of said chain; and adjusting the pitch diameter of one of said sprocket and said chain to thereby maintain a matched pitch diameter of said sprocket and chain drive arrangement, wherein the step of adjusting said pitch diameter is carried out in the first instance by the step of replacing said first set of tooth segments with a second set of tooth segments having a greater pitch than the pitch diameter of said first set of replaceable tooth segments, wherein the step of adjusting said pitch diameter is carried out in the second instance by rotating said pin bushings, and replacing said second set of tooth segments with said first set of tooth segments.

4. The method of claim 3 wherein the step of adjusting said pitch diameter in the third instance comprises the step of replacing said first set of tooth segments with said second set of tooth segments.

5. The chain and sprocket assembly of claim 3 wherein the root diameter of said second set of tooth segments have a root diameter greater than the root diameter of said first tooth segments.

6. The chain and sprocket assembly of claim 4 wherein the root diameter of said second set of tooth segments have a root diameter greater than the root diameter of said first tooth segments.

* * * * *